United States Patent [19]

Oliver

[11] Patent Number: 5,136,453

[45] Date of Patent: Aug. 4, 1992

[54] METHOD AND MEANS FOR SUPPRESSING GEOMAGNETICALLY INDUCED CURRENTS

[76] Inventor: Bernard M. Oliver, 13310 La Paloma, Los Altos Hills, Calif. 94022

[21] Appl. No.: 504,633

[22] Filed: Apr. 4, 1990

[51] Int. Cl.⁵ .............................................. G05F 1/325
[52] U.S. Cl. .......................................... 361/35; 361/38; 361/111; 361/159
[58] Field of Search ................... 361/35, 38, 111, 159 361/43, 44, 47, 58

[56] References Cited

U.S. PATENT DOCUMENTS

| | | | |
|---|---|---|---|
| 2,224,623 | 12/1940 | Welch | 361/35 |
| 2,296,099 | 9/1942 | Farnham | 361/35 |
| 3,621,334 | 11/1971 | Burns et al. | 361/35 |
| 3,708,744 | 1/1973 | Stephens et al. | 323/60 |
| 3,710,190 | 1/1973 | Althoff | 361/35 |
| 3,870,928 | 3/1975 | Allen | 361/23 |
| 4,045,823 | 8/1977 | Parton | 361/58 |
| 4,054,933 | 10/1977 | Praeg | 361/57 |
| 4,110,808 | 8/1978 | Hobson et al. | 361/44 |
| 4,124,885 | 11/1978 | Nordby | 363/56 |
| 4,346,340 | 8/1982 | Hackett-Jones | 323/249 |
| 4,540,931 | 9/1985 | Hahn | 323/264 |
| 4,591,819 | 5/1986 | Nero | 336/178 |
| 4,620,144 | 10/1986 | Bolduc | 323/331 |
| 4,757,420 | 7/1988 | Saletta et al. | 361/187 |
| 4,837,497 | 6/1989 | Leibovich | 323/345 |

FOREIGN PATENT DOCUMENTS

| | | | |
|---|---|---|---|
| 1916951 | 10/1970 | Fed. Rep. of Germany | 361/38 |
| 0080010 | 4/1934 | Sweden | 361/43 |
| 0124024 | 1/1959 | U.S.S.R. | 361/35 |

Primary Examiner—Steven L. Stephan
Assistant Examiner—Thomas M. Dougherty
Attorney, Agent, or Firm—A. C. Smith

[57] ABSTRACT

A polyphase electric power distribution system is protected from the effects of geomagnetic storms by countering the difference of potential between spaced grounding points in the system, and or by altering the magnetic circuits of transformers in the system to reduce half-cycle saturation and associated high peak currents.

7 Claims, 7 Drawing Sheets

METHOD AND MEANS FOR SUPPRESSING GEOMAGNETICALLY INDUCED CURRENTS

BACKGROUND OF THE INVENTION

1. Field of the Invention

This invention relates to schemes for protecting electric power distribution systems from the effects of current surges attributable to geomagnetic storms, and more particularly to the method and apparatus for reducing the effects of large direct currents induced in electric power equipment, for example, by geomagnetic storms.

Recently-published reports describe the problems that electric power distribution systems are experiencing as a result of direct currents (D.C.) induced in power lines by geomagnetic storms. Currents of as high as one million amperes are reported to circulate in the ionosphere around shifting paths as a result of solar flares. These induce potential differences as high as 20 volts per kilometer of separation between points on the Earth's surface. (See, for example, "Bracing for the Geomagnetic Storms," *IEEE Spectrum*, March 1990, pgs. 27-33.) As a result, large currents can flow in conductors of low impedance that connect the spaced points. Typically, the points may be connected by a three-phase transmission line having Y-connected transformers at each end with their neutral connections grounded.

A portion of the current attributable to the difference of potential at the spaced neutral grounding points can flow in each transformer winding of a transmission system and can easily cause half-cycle saturation in the transformer cores. This half-cycle saturation causes large harmonic currents, local heating, and other adverse effects which can precipitate system shutdown and regional power blackouts.

SUMMARY OF THE INVENTION

In accordance with the embodiments of the present invention, the effects of large direct currents from such differences of potentials between spaced points along electric power distribution systems are reduced by reducing the potential difference of the grounds in one embodiment and by altering the magnetic circuit of power-line transformers in response to this direct current in another embodiment.

DESCRIPTION OF THE PREFERRED EMBODIMENT

Figure 1:
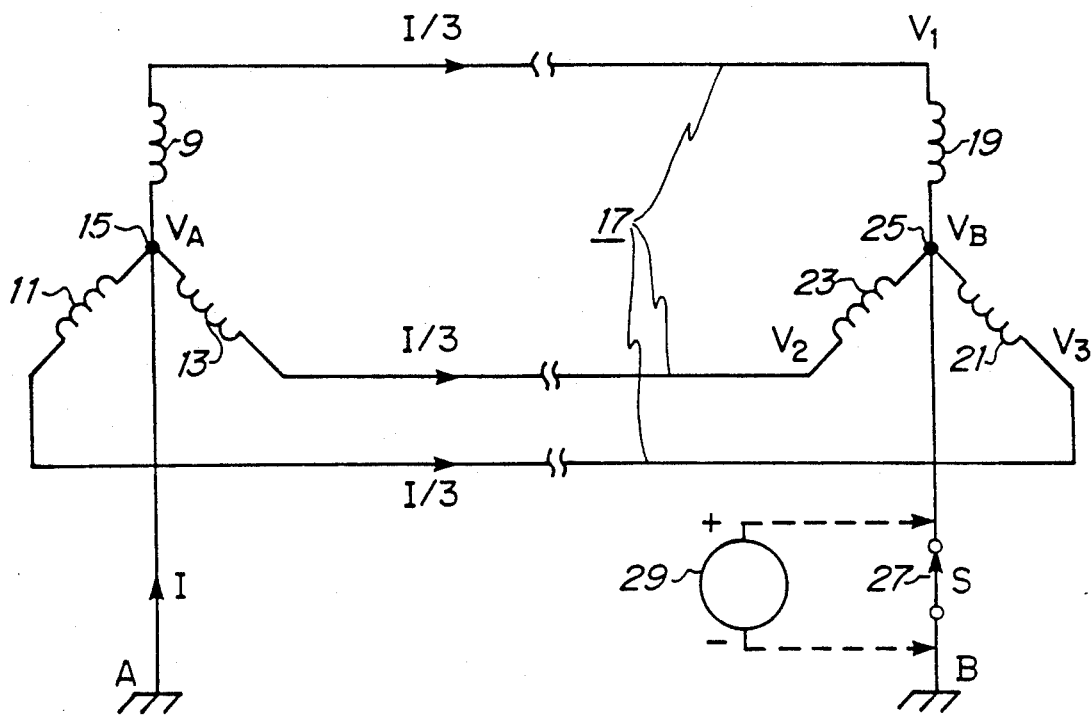
FIG. 1 is a schematic representation of a portion of an electric power distribution system between spaced ground points.

Referring now to the schematic diagram of a distribution system illustrated in FIG. 1, there is shown a plurality of Y-connected secondary windings 9, 11, 13 of a three-phase transformer system (primary windings not shown for simplicity) that are connected to a common, grounded node 15. The secondary windings are connected via transmission-line conductors 17 to corresponding Y-connected primary windings 19, 21, 32 of a three-phase transformer system (secondary windings are not shown for simplicity). The common connection node, or neutral, 25 of the windings 19, 21, 23 is grounded at a separate location from the ground connection or neutral 15, and this ground connection is illustrated as including switch 27 with a voltmeter 29 connected across the switch for purposes of the following discussion.

Assume that ground point A is at a positive potential with respect to ground point B in the sense that, if switch 27 is opened, the voltmeter connected across the open switch will read upscale by V volts. It should be noted that a transmission line 17 along a different route between points A and B might indicate a different potential due to different magnetic flux producing a different potential between the two points.

With the switch 27 closed, a current $I=V/R_L$ will flow around the loop, where $R_L$ is the loop resistance including 2/3 of the winding resistance of the transformers, ⅓ of the transmission line conductor resistance, and the ground resistance between points A and B, all in series. One third of this current will flow in each transformer winding and this level of direct current can easily cause half-cycle saturation in the transformer cores. It is this half-cycle saturation that causes large harmonic currents, local heating, and the other effects often leading to system shutdown and regional blackouts. To eliminate these direct currents, all the Y-connected nodes (or, neutrals) in the entire system might be left unconnected to ground except, perhaps, at only one of the Y-connected nodes in the system. However, leaving the other neutrals ungrounded can have undesirable side effects. If there is a load unbalance, for example, a heavy load on Phase 1, then the effect of an ungrounded neutral (e.g. opening switch 27) will be to cause the neutral voltage $V_n$ to follow the voltage $V_1$ thus reducing the power on Phase 1 and at the same time increasing the voltages and load powers on Phases 2 and 3. In addition, the third harmonics of the magnetizing currents for the three phases are in phase and normally flow to ground through the neutral. Thus, if this path is opened, third harmonic voltages will appear on the lines. If none of the side effects were too serious, then the simple expedient of opening the neutrals might avoid disaster. However, the emergency switching equipment, used to protect the system against severe load unbalances, line-to-ground shorts, lightning strikes, and other faults, makes use of devices that sense currents in the grounded neutral connection. This protection equipment would be rendered inoperative if the ground connection were broken.

Instead of leaving all the neutrals ungrounded, except perhaps for one neutral, another solution might be to tie them all back to the one grounded neutral via an additional conductor that followed the same route as the three-phase power lines 17. This fourth conductor would be a considerable added expense were it not already present in the form of the "ground" line above the power conductors that provides lightning protection in typical transmission-line installations. However, use of this line as a "neutral return" would require that it be insulated from each tower and then, to restore the lightning protection, the insulators would have to be shunted by spark gaps, or by thyrite semiconductor shunts, or the like. Then too, the resistance of the existing ground line might be too high, in which case it would have to be replaced by a conductor of larger diameter, all with concomitant retrofitting labor and expense.

Figure 2:
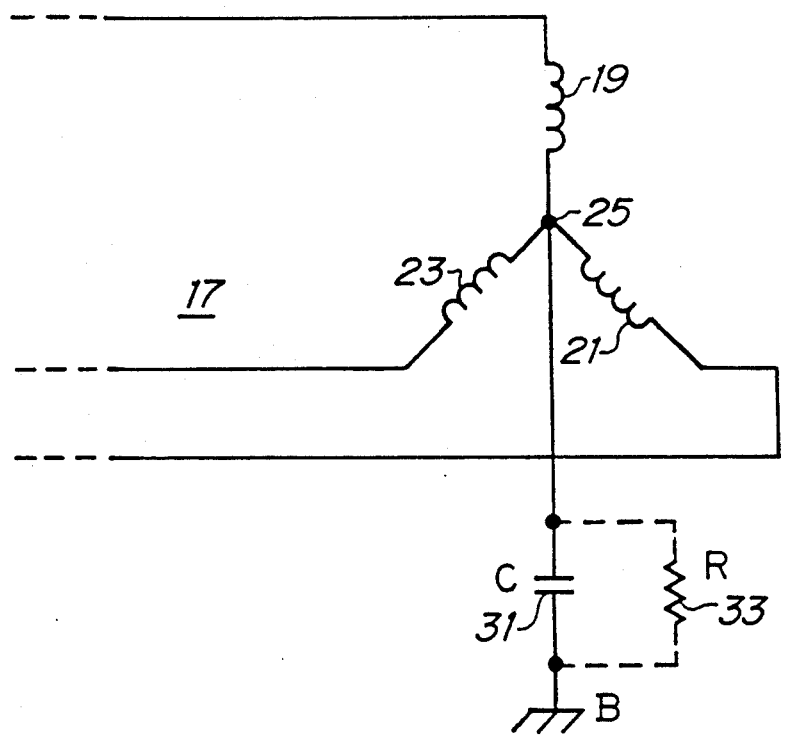
FIG. 2 is a simplified schematic representation of the characteristics of a desirable filter in the ground connection at one spaced point.

Generally, a desirable solution is to present a high resistance to ground at D.C. for all neutrals (save possibly one that is grounded directly) and at the same time present a low impedance to ground for alternating currents (A.C.). This suggests "grounding" all neutrals through a capacitor 31 having low reactance at 60 Hz in parallel with a high-value resistor 33, as shown in FIG. 2. However the capacitor 31 is likely to be quite large and expensive and it must be able to withstand, at least momentarily, the full load current of a single phase due to loss of load on the other two phases, as well as withstand surge currents due to faults and lightning strikes without developing reactive voltages in excess of its voltage rating. This probably means a reactance of under one ohm at power line frequency, which means a capacitance of over 2666 microfarads at several hundred volts rating.

Figure 3:
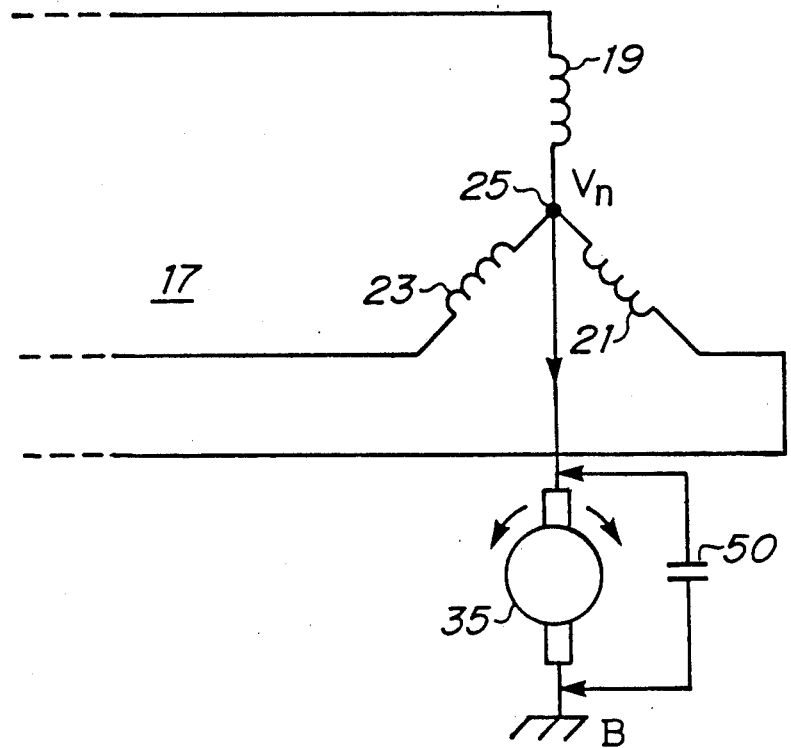
FIG. 3 is a schematic diagram of one embodiment of the present invention.

In accordance with the present invention, the need for such a capacitor is eliminated by connecting between the node, or neutral, and the ground point a device 35 which has very low A.C. impedance and which continually adjusts the D.C. voltage across its terminals to maintain the direct current flowing through it to or from the neutral essentially at zero, or at very low levels. Such a device, as illustrated in FIG. 3, is a D.C. motor 35 connected between the neutral 25 and the grounding point B. In this embodiment of the present invention, the D.C. motor 35 as illustrated with pictorial diagram of FIG. 5(a), includes constant-field excitation (or permanent-magnet field) 41 and an armature 47 having windings 43 which are connected via a commutator (not shown) and brushes 48 between the neutral and the grounding point.

Figure 4:
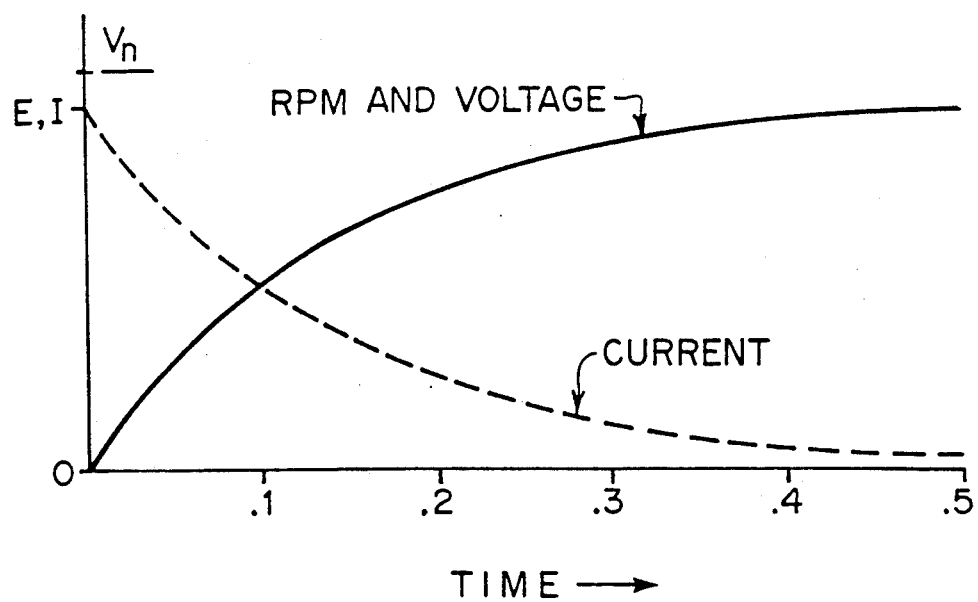
FIG. 4 is a graph illustrating the voltage, current and angular velocity with time associated with the D.C. motor in the embodiment of FIG. 3.

Assume that a geomagnetically-induced current $I=V/R_L$ suddenly appears, where the potential difference between grounding points is the (open circuit) voltage V that produces the current and $R_L$ is the loop resistance. Quickly, the motor starts turning and develops a counter emf, as shown in FIG. 4, that is nearly equal to V. Thus, the D.C. voltage V on the neutral rises nearly to Vn, and the current drops nearly to zero. The time constant of this transient depends on the loop resistance $R_L$ and on the magnetic circuit and the moment of inertia of the armature 47, as described below. The armature of the D.C. motor in the embodiment of FIG. 3 must be capable of conducting high alternating currents when rotating and when not rotating and thus must have large armature windings 43, commutator segments and brushes 48. Alternating current flowing in the windings 43 of the armature within a constant magnetic field 41 causes perturbations in the torque of the armature and generally produces vibration at the line frequency. The motor must therefore be sturdily mounted, and the armature windings 43 must be "potted" in the structure of the armature to assure that they do not move about under the influence of magnetomotive force exerted upon the conductors while conducting alternating current within a static or constant magnetic field 41. Where such constant magnetic field is supplied by permanent magnets, care must also be taken to avoid de-magnetization of the field magnets under the influence of alternating magnetic fields attributable to the alternating currents flowing in the armature windings. In the embodiment of FIG. 3, one or more of several different devices 50 may be connected across the brush terminals 48 to protect the motor in the circuit. For example, a circuit 'breaker'-type device may be connected across the brushes 48 to short the motor out on high levels of alternating currents. Alternatively, semiconductor devices and circuits may be connected across the brushes to short the motor for high levels of alternating currents while not shorting out D.C. potential across the brushes. Also, a capacitor may be connected across the brushes 48 to decrease high-frequency currents flowing through the motor and to suppress high frequency signals attributable to sparking between commutator and brushes.

Figure 5A:
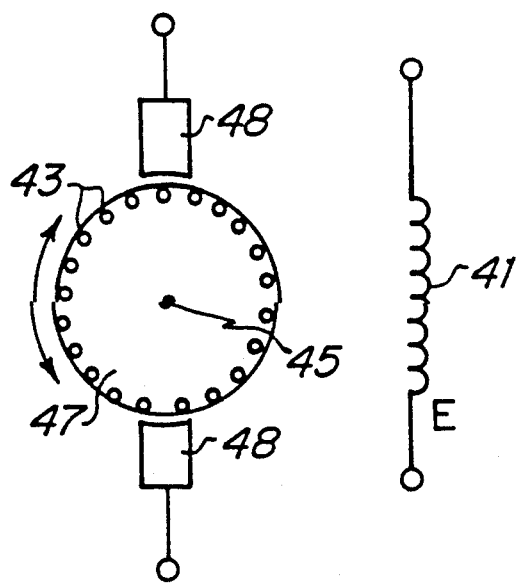
FIG. 5(a) is a representative diagram of the motor of FIG. 3.
Figure 5B:
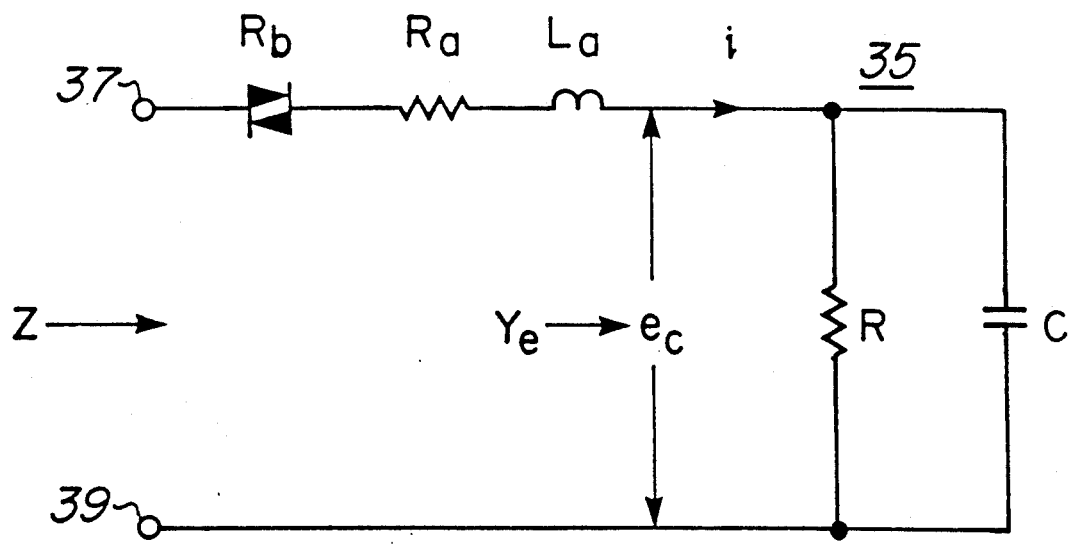
FIG. 5(b) is a representative equivalent circuit diagram of the motor of FIGS. 3 and 5(a)

Referring to FIG. 5(b), there is shown the equivalent circuit of the motor in the embodiment of FIGS. 3 and 5(a) as seen at the terminals 37, 39 connected through the brushes 48 to the armature windings. Assume that the motor either is separately excited or has a permanent magnet field 41 of strength B, and that the armature winding 43 has total length L in this field and is at a distance a from the axis 45 of rotation. The torque produced by the motor is then:

$$T = a(BL)i \qquad \text{(Eq. 1)}$$

while the counter emf is:

$$e_c = a(BL)\Omega \qquad \text{(Eq. 2)}$$

where $\Omega$ is the angular velocity of the armature 47. Dividing equation (1) by (2):

$$Y_e = \frac{i}{e_c} = \frac{1}{a^2(BL)^2} \frac{T}{\Omega} = \frac{Z_m}{a^2(BL)^2} \qquad \text{(Eq. 3)}$$

where $Y_e$ is the electrical admittance presented by the armature 47 and $Z_m$ is the mechanical (rotational) impedance of the armature. In complex notation with $p=j\omega$:

$$Z_m = R_w + pI_m \qquad \text{(Eq. 4)}$$

where $R_w$ is the ratio of steady state torque (due to windage and other frictional losses) to the angular velocity and $I_m$ is the moment of inertia of the rotating system. Also $I_m/a^2$ is the effective mass at a distance a from the axis 45. The electrical admittance is thus:

$$Y_e = g + pC \qquad \text{(Eq. 5)}$$

where $$g = \frac{R_w}{a^2(BL)^2} = \frac{1}{R} \quad \text{(Eq. 6)}$$

and $$C = \frac{I_m}{a^2(BL)^2} \quad \text{(Eq. 7)}$$

Since the windage torque or drag will normally increase faster than $\Omega$, $R_w$ and g can be expected to increase with speed so the system is not entirely linear. However, this variation affects only the D.C. behavior and is relatively unimportant. $I_m$ and therefore C are constant, and the impedances are therefore inverted to admittances by the magnetic coupling.

To this reflected admittance $Y_e$ are added the actual armature resistance $R_a$ and inductance $L_a$, as well as the non-linear brush contact resistance $R_b$. These are normally small and may be neglected in what follows, although it should be remembered that since the total brush-to-comutator drop is about ½ volt and occurs twice, the brush loss in watts is about equal to the armature current in amperes.

The equivalent capacitance of the motor 35 can be computed on the basis of some reasonable assumed values. Consider an armature of laminated steel to be a cylinder 12" in diameter and 20" long, to which the comutator adds another 12" at the same diameter for a total length (h) of about 0.8 meters. Assume the armature conductors 43 make 50 passes (from brush to brush) under 20"-long field poles. Then L=50×0.5 meters=25 m and a=0.15 m. If the armature density (including the comutator) $\mu$=7500 kg/m³, the moment of inertia will be approximately:

$$Im = \frac{\pi}{2} \mu a^4 h \quad \text{(Eq. 8)}$$

$$= \frac{\pi}{2} (7500)(0.15)^4 \, 0.8 \quad \text{(Eq. 9)}$$

$$= 4.77 \text{ kg m}^2 \quad \text{(Eq. 10)}$$

Taking B=1.41 tesla (i.e., 14,000 Gauss), then from Equation 7:

$$C = \frac{4.77}{(.15 \times 1.4 \times 25)^2} = .17 \text{ Farads} \quad \text{(Eq. 11)}$$

This level of capacitance yields extremely low A.C. impedance at power line frequency. If this capacitance is too high, it may be lowered by: (a) decreasing the diameter of the armature; (b) increasing the field strength (to perhaps 2 Tesla with Permendur armature and field-pole laminations; (c) increasing the length or adding more turns. With smaller motors, a flywheel might be added to increase the effective capacitance. From equation (2), at 1800 rpm (i.e., $\Omega = 2\pi \times 1800/60$):

$$e_c = .15 \times 25 \times 60\pi \quad \text{(Eq. 12)}$$
$$= 700 \text{ volts counter emf}$$

which is in the proper range for typical geomagnetic storms.

In another embodiment of the present invention, half-cycle saturation of the magnetic cores of three-phase transformers can be attributable to direct current (for example, induced by geomagnetic storms) producing a high, steady flux to which the A.C. flux adds in one direction and subtracts in the other direction. Such half-cycle saturation can be avoided by including controlled air gaps in the magnetic cores of the transformers. This, of course, increases the magnetizing current (in the absence of D.C. in the winding) and may require additional power-factor correction to restore system performance. However, it should be noted that the additional magnetizing current caused by an air gap in the magnetic circuit of a transformer is free of harmonics, and is typically a small sinusoidal current in quadrature with the voltage applied to the transformer and does not of itself represent real power, only reactive power.

From the literature, a typical 600 MVA power transformer is believed to operate with a normal magnetizing current of about 5 amperes peak and about 2 amperes rms. Introducing an air gap in the core that increased the normal magnetizing current to about 15 amps peak and 10 amps rms would greatly reduce the half cycle saturation by reducing the peak current levels of about 300 amps to peak currents levels of about 20 to 30 amps. Designing the transformers to operate at a lower peak flux density would also reduce the half-cycle peak currents.

In accordance with the present invention the transformer core is not interleaved but is constructed of 'E' and 'I', or 'E' and 'E', or double 'C' laminations preassembled and glued or 'potted' together with the mating faces ground flat to minimize the air gap. The transformer thus operates with low magnetizing current under normal operating conditions. Then, when direct currents appear, for example, during geomagnetic storms, the core halves are separated hydraulically to provide sufficient air gap to prevent half-cycle saturation.

Figure 6:
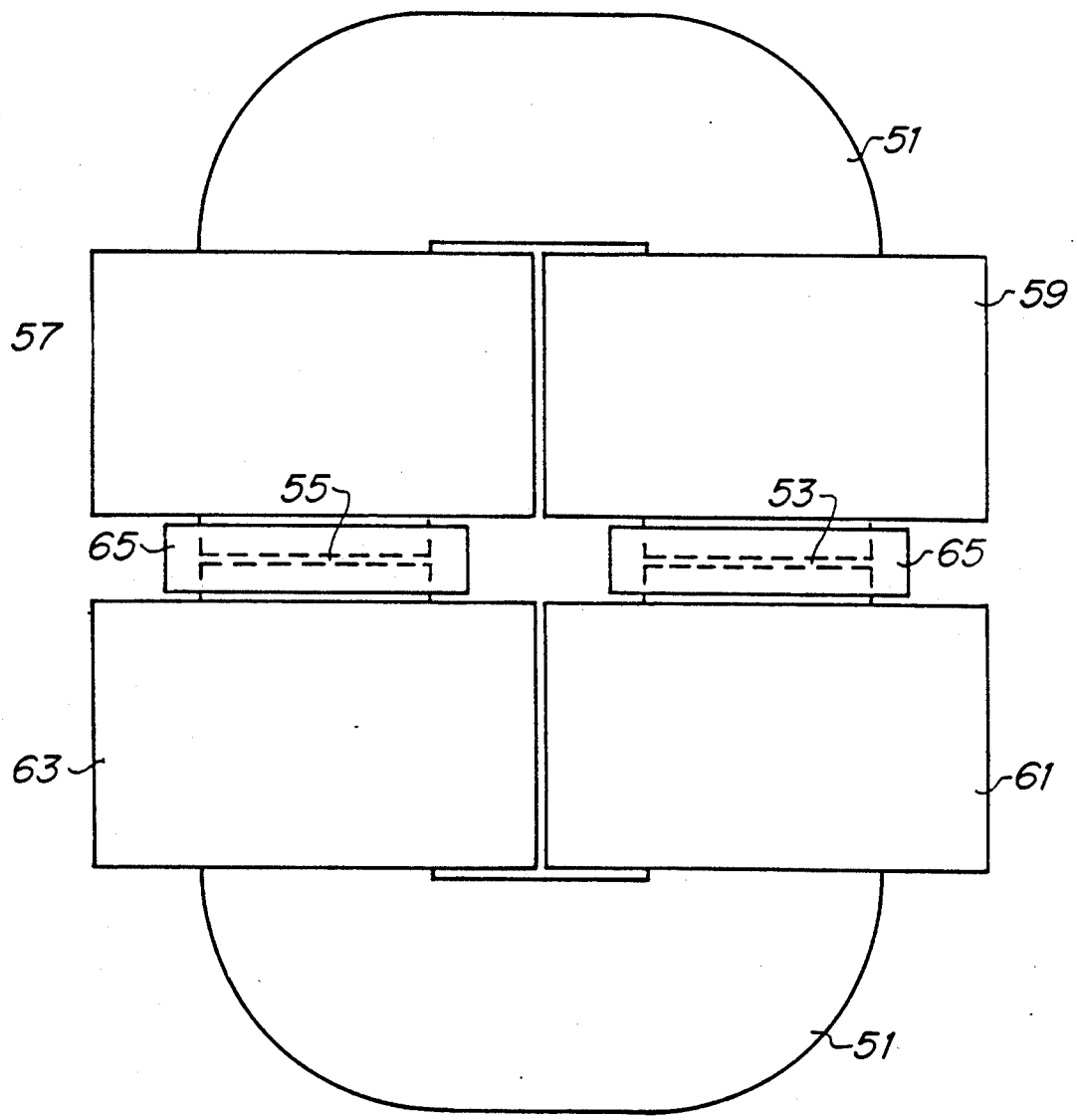
FIG. 6 is a pictorial view of a transformer according to the present invention for operation in one phase of a multiphase power distribution system.

Referring now to the pictorial diagram of FIG. 6, there is shown one embodiment of the present invention including upper and lower 'C'-shaped core sections forming the magnetic circuit with windings assembled thereon to form a transformer in one phase of a three-phase distribution system. The core 51 is wound in this embodiment in conventional manner from insulated sheet steel tape that is grain oriented to provide easy magnetization. After winding, the core 51 is solidly impregnated and cemented with epoxy or similar plastic adhesive. The core 51 is then cut into two 'C' sections with air gaps 53, 55 at the mating faces of the sections. These mating faces are lapped flat to form negligible air gaps for normal operation. Primary and secondary windings are wound together within the sections 57, 59, 61, 63 of the windings that are distributed around the core. The respective sections of primary and secondary windings are connected in series or parallel. The variable air gaps 51, 53 are in the spaces between the bobbins of the pairs of windings 57, 63 and 59, 61 on each leg of the core. This arrangement minimizes stray flux from the transformer. In other embodiments of the present invention, an 'E'-shaped core may include windings on each leg of the 'E' shape for three-phase operation, with the magnetic circuit completed by an 'I'-shaped core section disposed across the pole ends of each leg of the 'E' shape.

Figure 7:
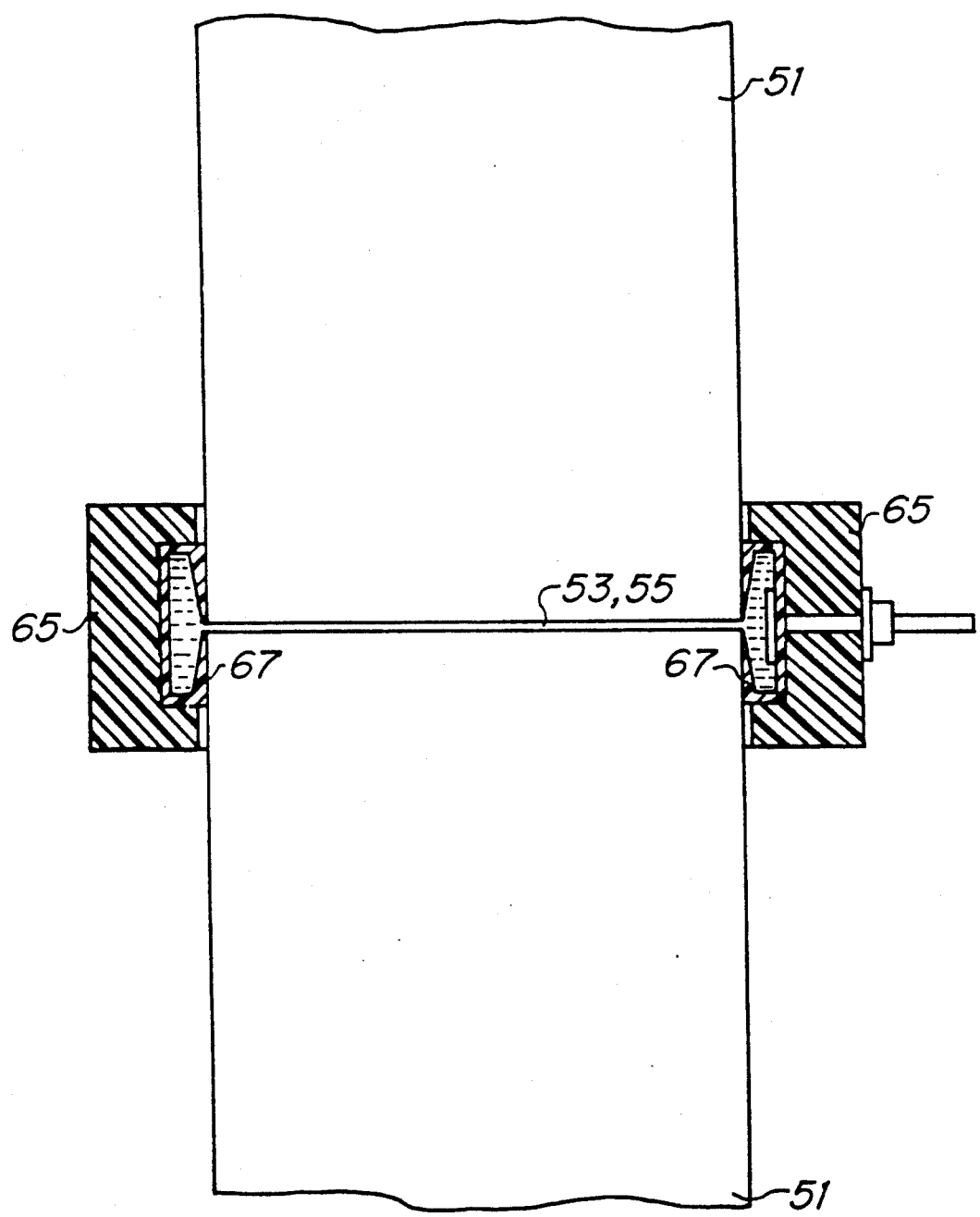
FIG. 7 is a partial sectional view of the core and variable air gap in the magnetic circuit of the transformer of FIG. 6.
Figure 8:
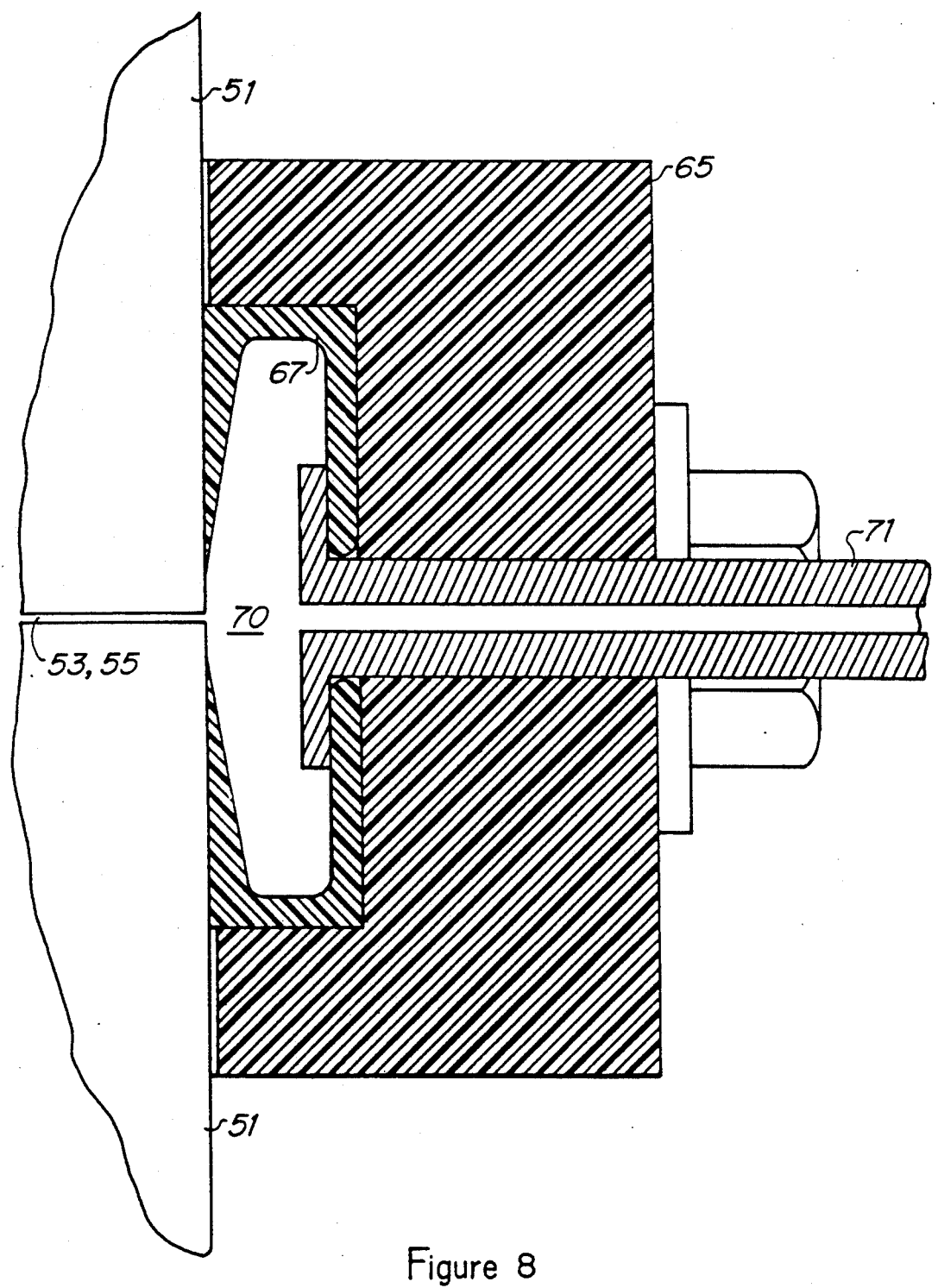
FIG. 8 is a sectional view of the hydraulic actuator according to one embodiment of the present invention for altering the air gap in the transformer of FIG. 6.

Referring now to FIG. 7 there is shown an enlarged view of one of the air gaps between mating pole faces in the core. The legs of the core are surrounded by a hard, strong plastic frame 65 containing a soft plastic boot or tire 67 that serves to seal the hydraulic chamber that is thus formed by the boot 67 about the core near the two pole faces. This obviates the need for additional pistons and cylinders which are thus provided by the design configuration of the present embodiment. FIG. 8 shows a cross section of the frame 65 where the hydraulic line 71 enters the hydraulic chamber 70. Here the boot 67 is illustrated as clamped firmly between the hard plastic frame 65 and the core 51, and the chamber 70 is fitted with the hydraulic line 71. The seal between the boot and the pole pieces is formed by stretching the boot over the pole to provide initial resilient contact pressure, and the additional force needed to provide the seal is furnished by pressurized hydraulic fluid within the chamber 70. The air gap between mating pole faces is thus filled with hydraulic oil having low permeability. In three-phase transformers for example, having 'E' and 'I'-shaped core sections as previously described, the air gaps should be maintained substantially equal during adjustments thereof.

Figure 9:
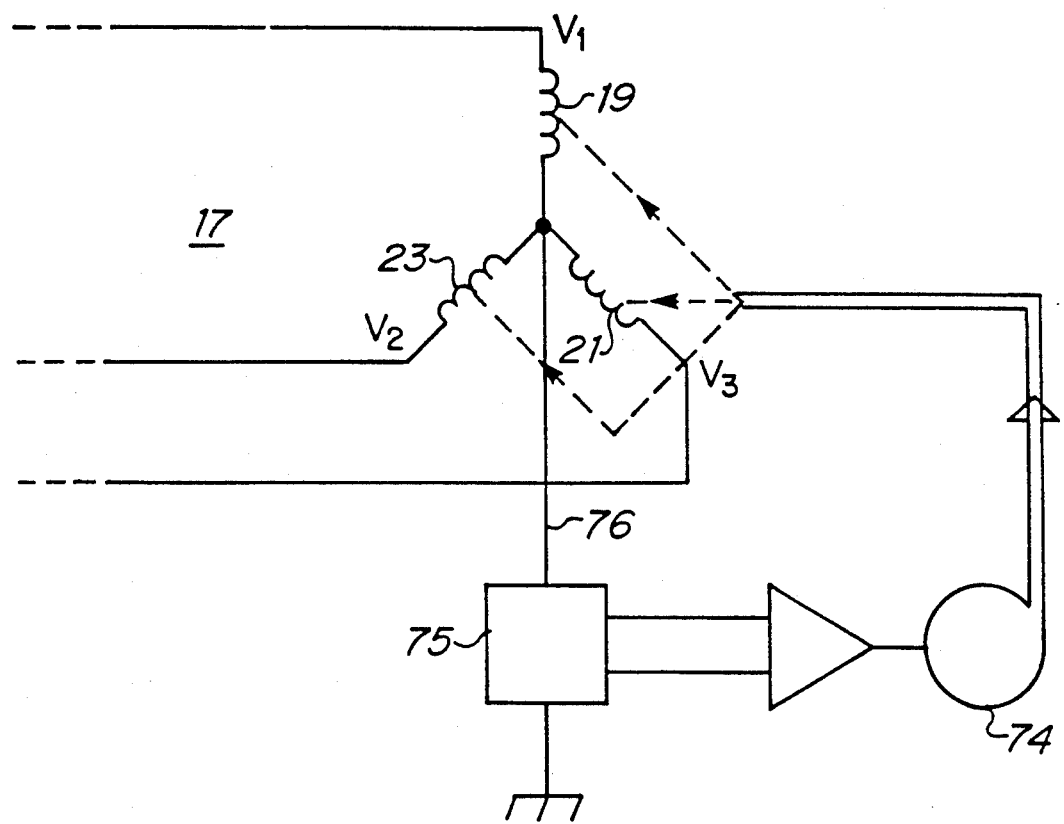
FIG. 9 is a schematic diagram of a sensing circuit for controlling operation of the hydraulic actuator of FIG. 8.

Referring now to FIG. 9, there is shown a simplified schematic diagram of a control circuit for controlling hydraulic fluid pressure within chamber 70 in response to direct current flowing in the neutral-to-ground connection of Y-connected three-phase transformers. A motor-driven pump 74 is connected to chamber 70 to provide hydraulic fluid under pressure to the chamber 70 associated with the core of each transformer in the Y-connection in response to the magnitude of direct current detected 75 within the neutral-to-ground connection 76. The detector 75 may include conventional flux-switched sensors or Hall-Effect devices, or the like, which are disposed to detect direct currents flowing in either direction to supply control signal to the pump 74 for increasing hydraulic pressure about the air gap 53, 55 to reduce the effects of direct current flowing in the connection 76. In one embodiment, the detector 75 detects the peaks of magnetizing current flowing in either direction and including direct current and half-cycle of alternating current for controlling the hydraulic pressure to alter the air gaps in order to reduce the peaks of magnetizing current to values below preselected limits. Of course, the direct current flowing in connection 76 may also power the pump 74 to expand the air gaps 53, 55 in servo-controlled manner in proportion to the magnitude of the direct current.

Therefore, the present invention reduces the effects of direct currents induced, for example, by geomagnetic storms to flow in the transformers of a polyphase electric power distribution systems. This is accomplished in one embodiment by opposing the difference of potential between spaced grounding points in the distribution systems, and in another embodiment by altering the air gap and associated saturation characteristics of the magnetic circuits of such transformers.

What is claimed is:

1. A method for reducing the effects of direct currents flowing in a polyphase electric distribution system having a plurality of transformers each having separable core structures with windings thereon connected to a common node that is connected to ground, the method comprising the steps of:
    detecting the direct current flowing in the connection of the common node to ground; and
    in response to the detected direct current, reducing the flux density attributable to the additive direct current and half-cycle alternating current within the transformers having windings connected to the grounded common node by introducing a gap of low permeability material into the magnetic circuit of each of said transformers.

2. The method according to claim 1 wherein for a polyphase transformer having a plurality of pole sections in a common core, a gap is introduced in each pole section of the common core.

3. The method according to claim 1 wherein in the step of introducing a gap, the core structures of the transformers are separated in proportion to the magnitude of said direct current.

4. The method according to claim 3 including the step of altering the gap in response to pressurized fluid introduced into the gap from a source of fluid under pressure in response to said direct current.

5. Apparatus for reducing direct currents flowing between spaced ground locations in a polyphase electric power distribution system comprising:
    a plurality of transformers with windings connected to a common node that is grounded at one location, each of said transformers including a core of magnetic material that includes a discontinuity in the magnetic circuit thereof which is alterable to include a gap therein; and
    actuator means responsive to direct current flowing in the connection of the common node to ground at said one location for altering the gap in the magnetic circuit of each of said plurality of transformers in proportion to the magnitude of the direct current flowing in said connection of the common node to ground.

6. Apparatus for reducing direct current flowing between spaced ground locations in a polyphase electric power distribution system comprising:
    a plurality of transformers with windings connected to a common node that is grounded at one location, each of said transformers including a core of magnetic material that includes a discontinuity in the magnetic circuit thereof which is alterable to include a gap therein;
    each said transformer including a core having a plurality of laminated elements that form the magnetic circuit thereof including a discontinuity that includes a pair of mating pole faces oriented in abutting relationship;
    actuator means responsive to direct current flowing in the connection of the common node to ground at said one location for altering the gap in the magnetic circuit of each of said plurality of transformers in proportion to the magnitude of the direct current flowing in said connection of the common node to ground;
    said actuator means including means disposed about the mating pole faces forming a fluid-tight chamber thereabout; and
    control means disposed to supply fluid under pressure to the chamber in response to direct current flowing in said connection of the common node to ground to alter the spacing between the mating pole faces in proportion to the magnitude of the direct current flowing in said connection.

7. Apparatus according to claim 6 wherein said control means includes a hydraulic pump connected to supply hydraulic fluid to the chamber; and comprising sense means coupled to the connection of the common node to ground at said one location for controlling the pump to supply hydraulic fluid under pressure to the chamber for altering the spacing between the mating pole faces at the discontinuity in the core in proportion to direct current flowing in said connection.

* * * * *